United States Patent [19]

Srnka

[11] Patent Number: 4,617,518

[45] Date of Patent: Oct. 14, 1986

[54] METHOD AND APPARATUS FOR OFFSHORE ELECTROMAGNETIC SOUNDING UTILIZING WAVELENGTH EFFECTS TO DETERMINE OPTIMUM SOURCE AND DETECTOR POSITIONS

[75] Inventor: Leonard J. Srnka, Houston, Tex.

[73] Assignee: Exxon Production Research Co., Houston, Tex.

[21] Appl. No.: 554,032

[22] Filed: Nov. 21, 1983

[51] Int. Cl.[4] .......................... G01V 3/06; G01V 3/15
[52] U.S. Cl. ..................................... 324/365; 324/364
[58] Field of Search ............... 324/334, 335, 357, 360, 324/362, 363, 364, 365

[56] References Cited

U.S. PATENT DOCUMENTS

| | | | |
|---|---|---|---|
| 2,293,024 | 8/1942 | Klipsch | 324/364 |
| 2,531,088 | 11/1950 | Thompson . | |
| 2,839,721 | 6/1958 | DeWitte . | |
| 2,872,638 | 2/1959 | Jones . | |
| 3,052,836 | 9/1962 | Postma . | |
| 3,113,265 | 12/1963 | Woods et al. | 324/363 X |
| 3,182,250 | 5/1965 | Mayes . | |
| 3,525,037 | 8/1970 | Madden et al. | 324/362 X |
| 3,967,190 | 6/1976 | Zonge | 324/362 |
| 4,041,372 | 8/1977 | Miller et al. | 324/362 X |
| 4,047,098 | 9/1977 | Duroux . | |
| 4,070,612 | 1/1978 | McNeil et al. | 324/334 |
| 4,298,840 | 11/1981 | Bischoff et al. . | |

OTHER PUBLICATIONS

Young et al., "Electromagnetic Active Source Sounding Near the East Pacific Rise," *Geophysical Research Letters*, vol. 8, No. 10, pp. 1043–1046 (Oct. 1981).

Cox, "Electromagnetic Induction in the Oceans and Inferences on the Constitution of the Earth," *Geophysical Surveys*, vol. 4, pp. 137–156, (1980).

Chave et al., "Controlled Electromagnetic Sources for Measuring Electrical Conductivity Beneath the Oceans: Forward Problem and Model Study," Journal of Geophysical Research, vol. 87, No. B7, pp. 5327–5338 (1982).

Kaufman et al., "Ocean Floor Electrical Surveys," presented at the 51st Annual International Meeting of the Society of Exploration Geophysicists (1981).

Coggon et al., "Electromagnetic Investigation of the Sea Floor," *Geophysics*, vol. 35, No. 3, pp. 476–489, (Jun. 1970).

*Primary Examiner*—Gerard R. Strecker
*Attorney, Agent, or Firm*—Alfred A. Equitz

[57] ABSTRACT

An improved method and apparatus for electromagnetic surveying of a subterranean earth formation beneath a body of water. An electric dipole current source is towed from a survey vessel in a body of water substantially parallel to the surface of the body of water and separated from the floor of the body of water by a distance less than approximately one-quarter of the distance between the surface and the floor. Alternating electric current, preferably including a plurality of sinusoidal components, is caused to flow in the source. An array of electric dipole detectors is towed from the survey vessel substantially collinearly with the current source. Each electric dipole detector of the array is separated from the current source by a distance substantially equal to an integral number of wavelengths of electromagnetic radiation, of frequency equal to that of a sinusoidal component of the source current, propagating in the water. A gradient detector array is also towed by the survey vessel in a position laterally separated from, or beneath, the mid-point of the current source. Additionally, an array of three-axis magnetic field sensors mounted in controllable instrument pods are towed by the seismic vessel on the flanks of the current source. Frequency-domain and time-domain measurements of magnetic and electric field data are obtained and analyzed to permit detection of hydrocarbons or other mineral deposits, or regions altered by their presence, within subfloor geologic formations covered by the body of water.

15 Claims, 2 Drawing Figures

METHOD AND APPARATUS FOR OFFSHORE ELECTROMAGNETIC SOUNDING UTILIZING WAVELENGTH EFFECTS TO DETERMINE OPTIMUM SOURCE AND DETECTOR POSITIONS

FIELD OF THE INVENTION

The present invention relates to methods and apparatus for electromagnetic surveying of a subterranean earth formation beneath a body of water. More particularly, the invention relates to methods and apparatus for positioning a source of alternating electric current in a body of water and measuring characteristics of the resulting electric and magnetic fields in the body of water at locations away from the current source.

BACKGROUND OF THE INVENTION

Electromagnetic survey systems are being used increasingly to explore for oil and gas on land. However, at present, practical methods for exploring for oil and gas in the offshore environment are restricted to the measurement of the natural magnetic and gravitational fields at the earth's surface, of the reflection of seismic energy from subsurface structures, or the seepage of chemical substances from mineral deposits beneath the sea floor into the seawater or atmosphere. Although passive techniques such as natural-source magnetotellurics can provide useful information about the lower crust and upper mantle, electromagnetic sounding techniques employing an active source are better suited for surveying subterranean formations within five to ten kilometers beneath the seafloor. Because practical techniques for active electromagnetic sounding of earth formations beneath the seafloor have not hitherto been known, the electrical structures of continental margins and offshore basins remain largely unknown, despite the scientific and economic importance of these areas.

Magnetotelluric methods for exploring the electrical structure of such relatively shallow geologic formations beneath the sea have limited practicality due to a lack of signal at the high frequencies (above 0.1 Hz) needed to probe rocks disposed at shallow depths beneath the seafloor. Incident electromagnetic waves having such high frequencies are attenuated by the sea. In shallow water, where this attenuation is reduced, electromagnetic noise may render such methods impractical.

"Resistivity" methods using an active source of direct electric current, or very low frequency alternating current (having a frequency sufficiently low that induction affects are insignificant), have been proposed for determining the apparent resistivity of geologic formations beneath the sea. For example, U.S. Pat. No. 4,298,840 issued Nov. 3, 1981 to Bischoff et al discloses a method and apparatus for determining the apparent resistivity profile of the seafloor using a bottom-towed cable. The bottom-towed cable of Bischoff et al includes a pair of current supply electrodes, for supplying to the water bottom low frequency alternating electric current. The bottom-towed cable also includes several receiver electrodes. The potential differences between pairs of the receiver electrodes are measured. Bischoff et al discloses no electromagnetic sounding method employing a variable frequency source, fails to discuss the optimal absolute spacing between the source and the center point of each receiver electrode pair, and fails to discuss the manner in which the optimal source operating frequency may be selected. Nor does Bischoff et al disclose any method for determining the depth of a resistive layer buried beneath the seafloor. Nor does Bischoff et al teach or suggest towing the source and receiver electrodes above the seafloor.

U.S. Pat. No. 3,052,836 issued Sept. 4, 1962 to G. W. Postma discloses a method and apparatus for marine electrical prospecting which uses an active alternating current source having two electrodes and an electrical receiver circuit having two electrodes. Postma requires that at least one current source electrode and both receiver circuit electrodes be towed through the water within a few feet of the seafloor. Postma teaches that there will inherently be electromagnetic coupling directly between the source and receiver circuits which coupling is independent of the characteristics of the earth formation beneath the seafloor. To eliminate the effect of this direct coupling on the signal measured by the receiver circuit, Postma teaches imposing an adjustable transfer impedance between the source and receiver circuits. Postma does not discuss how the distance between the source and receiver circuits may be adjusted to reduce the direct electromagnetic coupling therebetween. Postma discloses no preferred source-receiver spacing nor optimal source operating frequency. Postma fails to disclose any method for determining the depth of a resistive layer buried beneath the sea floor.

U.S. Pat. No. 2,531,088 issued Nov. 21, 1950 to R. R. Thompson discloses another method for measuring the resistivity of a geological formation beneath a body of water which involves dragging a cable, including a pair of current electrodes and a plurality of potential electrodes, along the bottom of the water. The source electrodes emit a very low frequency (less than $\frac{1}{8}$ Hz) sinusoidal signal or a periodically reversed (at a frequency less than $\frac{3}{8}$ Hz) DC signal. The potential difference between pairs of the potential electrodes are measured. Thompson fails to disclose any method using a variable frequency source or any method for determining the depth of a resistive layer buried beneath the water bottom.

U.S. Pat. Nos. 3,182,250, issued May 4, 1965 to F. M. Mayes; 2,872,638 issued Feb. 3, 1959 to S. B. Jones; and 2,839,721 issued June 17, 1958 to L. DeWitte also disclose methods for measuring the resistivity of subfloor earth formations employing DC or very low-frequency active sources, but do not disclose any method using a variable frequency source.

In addition to such resistivity methods, electromagnetic sounding methods using a variable frequency active source have been proposed. For example, the article "Electromagnetic Investigation of the Seafloor", *Geophysics*, Volume 35, No. 3 (June 1970), pages 476-489, by J. H. Coggon et al provides background discussion of the theory underlying such variable frequency active source methods, and suggests that the subfloor structure could be effectively probed by a system employing a vertical magnetic dipole source disposed at, or just above the seafloor and operated in a selected frequency range dependent on the conductivity of the subfloor structure and the source-to-receiver spacing. The Coggon et al paper discusses only a survey system employing a vertical magnetic dipole source and does not suggest any method using a tuned receiver array or any method for determining the depth of a buried resistive layer.

U.S. Pat. No. 4,047,098 issued Sept. 6, 1977 to Duroux discloses an electromagnetic active source sounding method employing an electric or magnetic dipole source and receivers towed at the surface of a body of water behind a seismic vessel. Duroux employs a pair of electrodes as a receiver for measuring the component of the electric field transverse to the direction of tow. Duroux also suggests measuring the radial and vertical components of the magnetic field at the surface of the water but does not describe any particular apparatus for so measuring the radial and vertical magnetic fields. Duroux teaches that the source-receiver spacing should be large relative to the desired investigation depth, and should preferably be at least double the desired investigation depth. Duroux does not suggest a preferred operating frequency for the dipole source and does not suggest disposing the source or receiver near the seafloor or indeed at any position below the surface of the body of water. Nor does Duroux suggest any method using a tuned array of electric dipole receivers or any method for determining the depth beneath the seafloor of a buried resistive layer.

SUMMARY OF THE INVENTION

According to the method of the invention, an electric dipole current source is towed from a survey vessel in a body of water substantially parallel to the surface of the body of water and separated from the floor by a distance less than approximately one-quarter of the distance between the surface and the floor. Alternating electric current is caused to flow in the source, said current including at least one sinusoidal frequency component. At least one electric dipole detector, including a pair of detector electrodes, is also towed from the survey vessel substantially collinear with the current source and spaced from the current source by a distance substantially equal to an integral number of wavelengths of electromagnetic radiation propagating in the water and having frequency equal to that of the sinusoidal component. A characteristic of the current emitted by the source and a characteristic of the potential difference between the pair of detector electrodes are measured. From these measurements, a characteristic of the complex mutual impedance of the current source and the dipole detector is determined. Preferably, the current emitted by the source includes a plurality of sinusoidal components each having a distinct frequency. Preferably, several dipole detectors are towed collinearly with the source. Measurements of the current characteristic and the potential difference characteristic should preferably be made at a plurality of frequencies for each source-detector pair.

In addition to the electric dipole detector array, a gradient detector array is towed by the survey vessel in a position laterally separated from, or beneath, the midpoint of the current source. The gradient detector array contains a pair of dipole antennae each terminating in a pair of electrodes electromagnetically coupled with the water and separated by a distance less than the distance between the source electrodes. One dipole antenna is oriented substantially parallel to the current source and the other is oriented substantially orthogonal to the current source. Additionally, an array of three-axis magnetic field sensors mounted in controllable instrument pods are towed by the survey vessel on the flanks of the current source.

Potential difference measurements at the electrode pairs of the gradient array and dipole array, and magnetic field measurements at the magnetic field sensors are made while the vessel is moving or stationary, and the measurements are interpreted to permit the detection of hydrocarbons or other mineral deposits, or regions altered by their presence, within subfloor geologic formations covered by the body of water. Frequency-domain measurements of magnetic and electric field data are analyzed to construct the complex impedance spectrum of the subfloor formation beneath each survey station. Time-domain measurements that may additionally be made include integration of portions of magnetic and electric field data recorded following a transient output pulse from the current source to measure conventional chargeability in the subfloor formation.

DESCRIPTION OF THE PREFERRED EMBODIMENT

Figure 1:
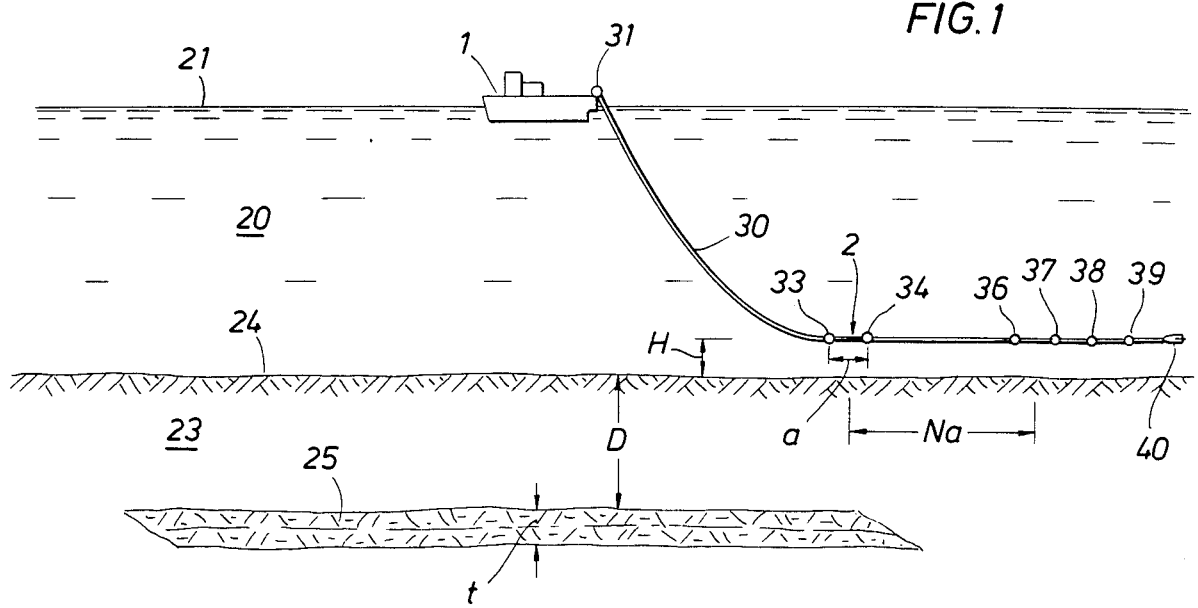
FIG. 1 is a vertical section through a body of water and earth strata below the water illustrating in simplified form the preferred embodiment of an offshore electromagnetic surveying system according to the present invention.
Figure 2:
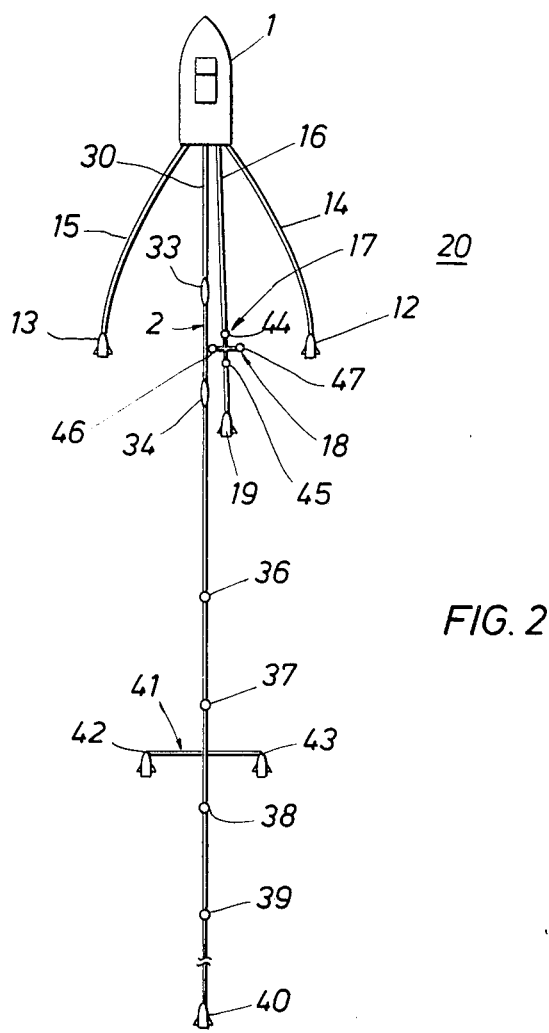
FIG. 2 is a top elevation view of an offshore electromagnetic surveying system illustrating the preferred embodiment of the present invention.

The preferred embodiment of the invention may be more easily understood with reference to FIGS. 1 and 2. FIG. 1 is a sectional view, taken in a plane perpendicular to surface 21 of body of water 20, illustrating in simplified form a portion of the preferred embodiment of the invention. Survey vessel 1 tows neutrally buoyant, flexible electrical cable 30 in body of water 20. Cable 30 is deployed from reel 31 into body of water 20. Attached to the free end of cable 30 is fish 40, whose position and depth are controllable in response to control signals generated aboard vessel 1. Although one fish is shown in FIG. 1, more than one may be attached to cable 30. Fish 40 may be selected from those commonly in use for controlling the position of a seismic streamer relative to a seismic vessel, such as those manufactured by Edo Corporation. Other means for controlling the depth and lateral position of any of the towed cables discussed herein, e.g., a paravane, may also be employed.

The term "water" as used herein is meant to include seawater, fresh water, swampwater, mud, marshwater, and any other liquid containing sufficient water to enable operation of the invention.

Cable 30 contains at least six conductors (not shown) each surrounded by insulating material. Source electrode 33, electrically coupled to body of water 20 is formed by suitably stripping the insulating material from a first conductor of cable 30. A conductive member having large surface area may be coupled to the stripped conductor and mounted on cable 30 to form source electrode 33. Source electrode 34 is similarly formed by stripping the insulating material from second conductor of cable 30. Electrode 33 and 34 are separated by a distance "a" and will collectively be referred to hereinafter occasionally as electric dipole current source 2. The first and second conductors of cable 30 are attached to an electric generator (not shown) aboard vessel 1 which energizes electric dipole current source 2. The generator is capable of producing variable output current (including sinusoidal current or current including at least two sinusoidal components having distinct frequencies) between electrodes 33 and 34. The electric generator may be selected from those known in the art, and is capable of generating between source electrodes 33 and 34 high peak currents (from about $10^3$ Amp. to about $10^5$ Amp.) at low voltages (from about 20 volts to 200 volts), in a regulated manner. Alternatively, to minimize the required size of cable 30 and the amount of power loss during transmission, high voltage AC power at 60 Hz may be transmitted from a generator aboard vessel 1 to a transformer near electrodes 33 and 34, which in turn powers a variable frequency transmitter coupled to electrodes 33 and 34. A signal indicative of the output current between source electrodes 33 and 34 is generated and recorded by instruments (not shown) aboard vessel 1.

Detector electrodes 36, 37, 38, and 39 may be formed, in a manner similar to that in which source electrodes 33 and 34 are formed, by stripping the insulating material from distinct conductors of cable 30. Although, four detector electrodes are shown in FIG. 1, it is within the scope of the invention to employ more or less than four detector electrodes. The potential differences between electrodes 36 and 37, and between detector electrodes 38 and 39 are measured and amplified, and thereafter further processed and recorded by electrical equipment (not shown) aboard vessel 1. The measured data is interpreted in a manner to be discussed below, to permit characterization of earth formation 23 beneath floor 24 of body of water 20 and to locate regions in subfloor formation 23 which possess "anomalous" properties indicative of mineral deposits. In a particular application, the measured data is interpreted to determine the presence and depth of a buried resistive layer, such as resistive layer 25, which has resistivity different from the average resistivity of that portion of formation 23 above resistive layer 25.

Each pair of detector electrodes between which a potential difference (or voltage) characteristic is measured will collectively be referred to as an "electric dipole detector." The electric dipole detectors will collectively be referenced to as the "electric dipole detector array."

It is preferred that electric dipole current source 2 and the electric dipole detectors be towed substantially collinearly, substantially parallel to surface 21, and in approximately the lower quarter of the column of water between surface 21 and floor 24. As the depth below surface 21 at which dipole current source 2 and the dipole detectors are towed decreases to less than three fourths the distance between floor 24 and surface 21, the strength of the signal at the dipole detectors which is indicative of the electrical resistivity of subfloor formation 23 (the "anomaly" signal) rapidly decreases due to masking by the water between floor 24 and the dipole detectors. It is additionally desirable to tow the apparatus within the lower quarter of the column of water between surface 21 and floor 24 because in that region, the sensitivity of the anomaly signal to the height above floor 24 at which the apparatus is towed is sufficiently weak that fish 40 need only control the actual tow depth to within about five percent of the desired tow depth.

If electrodes 33 and 34 are separated by a first distance, and adjacent pairs of electrodes 36, 37, 38, and 39 are also separated by substantially the first distance, then for direct detection of buried resistive layer 25 located a second distance, D, below floor 24, the midpoint of current source 2 and the midpoint of one of the electric dipole detectors should be separated by at least 2D, and preferably should be separated by at least 3D.

Also for detection of buried layer 25, the output current at current source 2 should preferably include a sinusoidal component having frequency equal to the "skin depth frequency" associated with buried resistive layer 25. Such skin depth frequency, equal to $\rho/\pi\mu D^2$, where $\rho$ and $\mu$ are the average resistivity and magnetic permeability (respectively) of the region of earth formation 23 above buried layer 25, is that frequency which makes the electromagnetic skin depth in the surveyed region of earth formation 23 equal to the depth, D, of buried resistive layer 25. The effective depth to which the survey can penetrate earth formation 23 is determined by the electromagnetic skin depth, d, given by d $=(\pi\mu\sigma f)^{-\frac{1}{2}}$, where f is the source frequency, and $\mu$ and $\sigma$ are the average magnetic permeability and average conductivity (respectively) of the surveyed portion of earth formation 23. Normally, $\mu$ will be substantially equal to $\mu_o$, the magnetic permeability of free space.

I have found that the influence of the electromagnetic coupling directly between source 2 and each dipole detector (which coupling is independent of the characteristics of earth formation 23) on the potential difference measurements at such dipole detector may be desirably reduced by spacing each such dipole detector from the source an integral number, n, of wavelengths, $\lambda_w$, of the electromagnetic signal from source 2. Wavelength $\lambda_w$ is given by the expression $\lambda_w = 2(\pi\rho_w/\mu_o f)^{\frac{1}{2}}$, where $\rho_w$ is the low-frequency electrical resistivity of body of water 20, $\mu_o$ is the magnetic permeability of free space, and f is the source frequency. If source 2 and each dipole detector are so spaced from each other, all of the changes in the phase of the signal measured at each detector (relative to the phase of the output current at source 2) are due to electromagnetic signals propagating along or below floor 24.

Thus, the array of dipole detectors can be tuned for maximum sensitivity to geologic structure by adjusting the source frequency and the spacing between the source and dipole detectors.

If it is desired to make the surveying system particularly sensitive to a resistive layer buried at a depth D below floor 24, and if the average conductivity, $\sigma$, of earth formation 23 is known to a depth just above depth D, then the separation between source 2 and each dipole detector should be chosen to be substantially equal to an integral multiple of $2\pi D(\rho_w\sigma)^{\frac{1}{2}}$ and the source current should be chosen so as to include a sinusoidal component having frequency substantially equal to the skin depth frequency associated with depth D.

It is desirable to generate, from the potential difference measurements made at each dipole detector, a signal indicative of the complex mutual impedance of source 2 and such detector. From analysis of variations or "anomalies" in the phase and amplitude of such complex mutual impedance signal the presence of a buried resistive layer such as layer 25 may be determined. I have found that the depth to such buried layer may be estimated by employing a plurality of detector dipoles in the electric dipole detector array and employing a variable frequency dipole source, and making potential difference measurements at each detector for each of a plurality of distinct source frequencies. In particular, it has been found that the frequency at which the phase or amplitude anomalies indicative of buried layer 25 are at a peak (or maximum) will decrease as the separation between source and detector increases, until such separation increases to a critical separation equal to three times the depth of buried layer 25 beneath floor 24.

Beyond such critical separation, the value of source frequency giving the peak signal anomalies remains substantially constant. By determining the value of such substantially constant frequency, $f_c$, the depth of buried resistive layer 25 may be estimated as $D=(\pi\mu\sigma f_c)^{-\frac{1}{2}}$, where $\mu$ and $\sigma$ are the average magnetic permeability and conductivity (respectively) of formation 23 above buried layer 25. As noted above, $\mu$ is normally substantially equal to $\mu_o$, the magnetic permeability of free space.

It is preferred that in addition to the electric dipole detectors shown in FIG. 1, additional electric field and magnetic sensors (not shown in FIG. 1 for simplicity) be towed from survey vessel 1. The structure and function such additional sensors will be discussed below with reference to FIG. 2.

FIG. 2 is a top elevation view of an offshore electromagnetic surveying system illustrating the preferred embodiment of the apparatus of the invention. The apparatus includes electric dipole current source 2 and an electromagnetic receiving system towed behind survey vessel 1, which floats in body of water 20. Electric dipole current source 2 is towed from survey vessel 1 by flexible, neutrally buoyant electrical cable 30. Electrodes 33 and 34, which may be bare metal and formed in the manner discussed above with reference to FIG. 1, should have large surface area, to keep the peak current density as small as possible. Electrodes 33 and 34 are electrically coupled to an electric generator (not shown) aboard vessel 1. The generator is capable of producing variable current at electrodes 33 and 34, as discussed above with reference to FIG. 1. The receiving system includes an electric dipole detector array including detector electrodes 36, 37, 38, and 39. It is within the scope of the invention to employ more or less than four detector electrodes in the dipole detector array. Controllable fish 40 is attached to the free end of electrical cable 30 for positioning source 2 and the dipole detector array at a desired depth during a stationary or moving survey. Other means for controlling the depth or lateral position of any of the towed cables discussed herein, e.g., a paravane, may also be employed. The dipole detector array is towed substantially collinearly with electric dipole current source 2, substantially parallel to surface 21 of body of water 20. In order to perform a "direct" survey (in which the target of the survey is buried a particular distance below floor 24, and the electrical properties of the portion of earth formation 23 above the target are substantially unaltered by the target) of earth formation 23 to a sufficient depth for hydrocarbon exploration, a separation of up to three statute miles between current source 2 and the dipole detectors may be desirable. At such a separation, source 2 should have dipole moment (defined as the product of the peak current and the separation between the source electrodes) on the order of $10^6$ ampere-meters for the signal-to-noise ratio at the dipole detectors to be acceptable. However, in performing an indirect "chimney-detection" survey a much smaller source dipole moment (on the order of $10^3$ ampere-meters) and much smaller source-to-detector separations are sufficient.

For performing the direct survey method, the dipole detectors preferably should have sufficient sensitivity to detect variations in electric field on the order of $2 \times 10^{-7}$ volts/meter, for operations in seawater where the source-to-detector spacing is about three statute miles, the source dipole moment is about $10^6$ ampere-meters, and the detector array tow height above the seafloor is about 100 meters and the water depth exceeds about 400 meters. Suitable detector electrodes may be formed in the manner discussed above with reference to FIG. 1. Alternatively, silver-silver chloride detector electrodes connected by salt bridges may be suitable.

A buried resistive object, such as buried layer 25, may electrically alter a zone of subfloor formation 23 (known as a "chimney") extending above the object very nearly to floor 24. In the case where buried object 25 is associated with such a chimney extending up to a very shallow depth beneath floor 24, the chimney may be a detectable target for the subsystem consisting of source 2 and the electric dipole detector array. As noted above, the required separation between source 2 and the dipole detectors of the electric dipole detector array will be substantially less than in the case where no such chimney is associated with buried object 25.

Wire antenna 41, whose function will be discussed below, is also attached to, but electrically insulated from cable 30. Controllable fish 42 and 43, are attached, respectively, to the ends of antenna 41 for controlling the orientation of the antenna.

The electromagnetic receiving system also includes flexible, neutrally buoyant signal cable 16 which tows first gradient array dipole antenna 17 oriented substantially parallel to electric dipole current source 2, and second gradient array dipole antenna 18, oriented substantially perpendicularly to electric dipole current source 2. Gradient array dipole antennae 17 and 18 will collectively be referred to hereinafter as the "gradient array". Controllable fish 19 is attached to the free end of cable 16 for positioning the gradient array at a desired position relative to current source 2. The electromagnetic receiving system also includes flexible, neutrally buoyant signal and power cable 14 and flexible, neutrally buoyant, signal and power cable 15, which tow, respectively, first magnetic field sensor pod 12 and second magnetic field sensor pod 13.

Gradient array dipole antenna 17 includes detector electrodes 44 and 45, which may be constructed in the same manner as are electrodes 36, 37, 38, and 39. Detector electrodes 44 and 45 are separated by a distance less than the distance between adjacent pairs of electrodes 36, 37, 38, and 39. Gradient array dipole antenna 18, which includes detector electrodes 46 and 47, is identical to antenna 17, but is oriented orthogonally with respect thereto. Antenna 17 may be held orthogonal to antenna 18 with guy wires (not shown). Antennae 17 and 18 may alternatively be enclosed in a suitable instrument pod (not shown), which may be selected from those commonly used for marine applications. Antennae 17 and 18 should be towed in a position adjacent the midpoint of source 2, but located below or laterally displaced therefrom, and oriented so that the antennae are substantially parallel to surface 21. The potential differences between the electrodes of antenna 17 and between the electrodes of antenna 18 are measured and recorded by means of electrical instruments (not shown) aboard vessel 1. The measured data, which has high resolution relative to the data recorded at electrodes 36, 37, 38, and 39, is used to characterize the electric properties of the region of formation 23 located substantially directly below source 2 and within a short distance of floor 24.

Magnetic field sensor pods 12 and 13 are identical. Each contains a three-axis magnetic field sensor, selected from those commonly used for obtaining true vector magnetic field measurements, and a device for measuring the orientation of the magnetic field sensor. For example, a three-axis flux gate vector instrument package of the type manufactured by TRW, Inc. would be suitable for use as a magnetic field sensor. A three-axis accelerometer package of the type manufactured by Sperry Corporation would be suitable for use as an orientation measuring device. Pods 12 and 13 may be selected from those commonly used for controlling the vertical and horizontal position of a seismic streamer relative to a seismic vessel, such as those manufactured by Edo Corporation. The pods preferably should be towed symmetrically with respect to source 2, each in a position laterally spaced therefrom, and at a depth within body of water 20 substantially equal to the depth at which the electric dipole detector array is towed. It is within the scope of the invention, however, to tow magnetic field sensor pods 12 and 13 at any desired depth within body of water 20. The measured vector magnetic field data is transmitted through cables 14 and 15 to electrical instruments aboard vessel 1 and is recorded. Electric field sensors may also be included in pods 12 and 13 and coupled to electrical instruments aboard vessel 1. It is within the scope of the invention to utilize more than one pair of magnetic field sensor pods, positioned symmetrically with respect to source 2.

Objects of finite size buried in subfloor formation 23, and having resistivity contrasting with that of the average resistivity of the subfloor formation, will produce in response to the electric current emitted by dipole source 2, components of electromagnetic fields in body of water 20 in the directions perpendicular to the axis of electric dipole source 2. The strength of such perpendicular electromagnetic field components will be greatest above the edges of the buried object (or the associated chimney thereabove). Thus, anomalies detected in the data measured by gradient array dipole antenna 18 and the magnetic field sensors in pods 12 and 13, will delineate the location of such edges.

Also to facilitate delineation of the edges of finite buried targets, insulated wire antenna 41 is attached to electrical cable 30. The orientation of wire antenna 41 is controlled by steerable fish 43 and steerable fish 42 attached, respectively, to the ends of wire antenna 41. In response to control signals generated aboard vessel 1, fish 42 and 43 may be steered to control the orientation of antenna 41. In particular, by orienting antenna 41 substantially parallel to surface 21, the changes in the horizontal component of the electric field at antenna 41 may be measured and analyzed to delineate the edges of a buried resistive target in subfloor formation 23. If desired, several antennae similar to antenna 41 may be attached to cable 30 at various separations from source 2. In an alternate embodiment, antenna 41 may be maintained in position substantially perpendicular to cable 30 by guy wires.

The above description is merely illustrative of the present invention. Various changes in the shapes, sizes, materials, or other details of method or construction may be within the scope of the appended claims without departing from the spirit of the invention.

I claim as my invention:

1. A method for surveying and characterizing a region of an earth formation beneath a body of water having a surface and a floor, said region extending to a first depth below the floor, comprising the stpps of:

positioning an electric dipole current source, including a pair of source electrodes separated by a first distance, substantially parallel to the surface of the body of water and separated from the floor by a second distance, the second distance being less than approximately one-fourth of the distance between the surface and the floor;

causing alternating electric current to flow in the source, said current including a first sinusoidal component having a selected frequency;

measuring a current characteristic of said current;

contemporaneously positioning at least one electric dipole detector, including a pair of detector electrodes separated by a third distance substantially equal to said first distance, substantially collinear with the current source and spaced from the current source by a fourth distance, where said fourth distance is approximately equal to an integral multiple of the wavelength of electromagnetic radiation having said selected frequency in the body of water;

measuring a characteristic of the potential difference between the pair of detector electrodes; and determining a characteristic of the complex mutual impedance of the current source and the at least one dipole detector from said current characteristic and said potential difference characteristic.

2. The method of claim 1 where said selected frequency is the frequency at which the electromagnetic skin depth in the earth formation is approximately equal to the first depth.

3. The method of claim 2 where said first distance is approximately equal to the wavelength of electromagnetic radiation having said selected frequency in the body of water.

4. The method of claim 1 where the fourth distance exceeds about three times the first depth.

5. The method of claim 1 where the alternating electric current caused to flow in the source also includes a second sinusoidal component having a second frequency different from said selected frequency.

6. A method for surveying and characterizing a region of an earth formation beneath a body of water having a surface and a floor, comprising the steps of:

positioning an electric dipole current source, including a pair of source electrodes separated by a first distance, substantially parallel to the surface of the body of water and separated from the floor by a second distance, the second distance being less than approximately one-fourth of the distance between the surface and the floor;

causing alternating electric current to flow in the source, said current including at least two sinusoidal components each having a distinct selected frequency;

measuring a current characteristic of said current;

contemporaneously positioning at least one electric dipole detector, including a pair of detector electrodes separated by a third distance substantially equal to said first distance, substantially collinear with the current source and spaced from the current source by a fourth distance, where said fourth distance is approximately equal to an integral multiple of the wavelength of electromagnetic radiation having said selected frequency in the body of water;

measuring a characteristic of the potential difference between the pair of detector electrodes; and determining a characteristic of the complex mutual impedance of the current source and the at least one electric dipole detector from said current characteristic and said potential difference characteristic, said mutual impedance characteristic being indicative of the average resistivity of the region.

7. A method for surveying and characterizing a region of an earth formation beneath a body of water having a surface and a floor, comprising the steps of:

positioning an electric dipole current source including a pair of source electrodes separated by a first distance, substantially parallel to the surface of the body of water and separated from the floor by a second distance, the second distance being less than approximately one-fourth of the distance between the surface and the floor;

causing alternating electric current to flow in the source, said current including at least two sinusoidal components each having a distinct selected frequency;

measuring a current characteristic associated with each of said at least two sinusoidal components of said current;

contemporaneously positioning at least one electric dipole detector, including a pair of detector electrodes separated by a third distance substantially equal to said first distance, substantially collinear with the current source and spaced from the current source by a fourth distance, where said fourth distance is approximately equal to an integral multiple of the wavelength of electromagnetic radiation having said selected frequency in the body of water;

measuring for each of said at least two sinusodial components of said current, a characteristic of the potential difference between the at least one pair of detector electrodes; and determining for each of said at least two sinusoidal components of said current a characteristic of the complex mutual impedance of the current source and the at least one electric dipole detector.

8. A method for surveying and characterizing a region of an earth formation beneath a body of water having a surface and a floor, said region extending to a first depth below the floor, comprising the steps of:

positioning an electric dipole current source including a pair of source electrodes separated by a first distance, substantially parallel to the surface of the body of water and separated from the floor by a second distance of less than approximately one-fourth of the distance between the surface of the floor;

contemporaneously positioning at least two electric dipole detectors in the body of water, each of said detectors including a pair of detector electrodes separated by a third distance substantially equal to said first distance, substantially collinear with, and spaced from the current source by a fourth distance, where said fourth distance is approximately equal to an integral multiple of the wavelength of electromagnetic radiation having said selected frequency in the body of water;

causing alternating electric current to flow in the source, said current including at least two sinusoidal components, each having a distinct selected frequency;

measuring a current characteristic associated with each of said at least two sinusoidal components of said current;

measuring for each of said at least two sinusoidal components of said current, characteristic of the potential difference between the pair of detector electrodes of each of said at least two detectors; and determining for each of said at least two detectors, and for each of said at least two sinusoidal components of the current, a characteristic of the complex mutual impedance of the current source and said detector, from the current characteristic and potential difference characteristic associated with said sinusoidal component and said detector.

9. The method of claim 8 wherein the lowest frequency sinusoidal component of said at least two sinusoidal components of the current and the mutual impedance characteristics associated with said lowest frequency sinusoidal component are chosen so that said mutual impedance characteristics associated with said lowest frequency sinusoidal component determine the average resistivity of a portion of the region located within a second depth from the floor, said second depth being less than the first depth.

10. A method for surveying and characterizing a region of an earth formation beneath a body of water having a surface and a floor, said region extending to a first depth below the floor, comprising the steps of:

(a) positioning an electric dipole current source including a pair of source electrodes separated by a first distance, substantially parallel to the surface of the body of water and separated from the floor by a second distance of less than approximately one-fourth of the distance between the surface of the body of water and the floor;

(b) contemporaneously positioning a plurality of electric dipole detectors in the body of water, each of said detectors including a pair of detector electrodes separated by a third distance substantially equal to said first distance, substantially collinear with, and spaced from the current source;

(c) causing alternating electric current to flow in the source, said current including at least two sinusoidal components, each having a distinct selected frequency, and wherein the lowest frequency sinusoidal component of said at least two sinusoidal components of the current and the mutual impedance characteristics associated with said lowest frequency sinusoidal component are chosen so that said mutual impedance characteristics associated with said lowest frequency sinusoidal component determine the average resistivity of a portion of the region located within a second depth from the floor, said second depth being less than the first depth;

(d) measuring a current characteristic associated with each of said at least two sinusoidal components of said current;

(e) measuring for each of said at least two sinusoidal components of said current, a characteristic of the potential difference between the pair of detector electrodes of each of said detectors;

(f) determining for each of said detectors, and for each of said at least two sinusoidal components of the current, a characteristic of the complex mutual impedance of the current source and said detector, from the current characteristic and potential difference characteristic associated with said sinusoidal component and said detector, wherein the complex mutual impedance characteristics are indicative of the presence of a resistive layer having resistivity different from said average resistivity and located in said region at a third depth below the floor, said third depth being greater than said second depth;

(g) determining the sinusoidal component for which the magnitude of the complex mutual impedance characteristics associated with a first of said plurality of detectors is an extremum;

(h) repeating step (g) for a sufficient number of different detectors selected from said plurality of detectors for determining a minimum distance from the source beyond which minimum distance the same sinusoidal component is associated with each extremum magnitude of said mutual impedance characteristics associated with each detector separated from the source by a distance farther than said minimum distance; and (i) determining the third depth from said minimum distance and said average resistivity.

11. A system for surveying and characterizing an earth formation beneath a body of water having a surface and a floor, comprising:

a floating vessel;

an electric dipole current source including a pair of source electrodes separated by a first distance, towed from said floating vessel in the body of water substantially parallel to the surface of the body of water;

means for generating alernating electric current in the electric dipole current source;

at least one electric dipole detector including a pair of detector electrodes separated by a second distance substantially equal to said first distance, towed by said floating vessel in the body of water substantially collinearly with the current source and spaced from the current source by a third distance approximately equal to an integral multiple of the wavelength of electromagnetic radiation in the body of water having frequency equal to that of a frequency component of said alternating electric current;

means electrically coupled to the electric current generating means for measuring a current characteristic of said current;

means electrically coupled to the at least one electric dipole detector for measuring a characteristic of the potential difference between the pair of detector electrodes; and means electrically coupled to the current characteristic measuring means and the potential difference characteristic measuring means for determining a characteristic of the complex mutual impedance of the current source and said at least one detector from said current characteristic and said potential difference characteristic.

12. The system of claim 11, also comprising:

means for controlling the depth beneath the surface at which the current source and the detector are towed, so that the current source and the detector may be towed at a selected depth greater than approximately three fourths of the distance between the surface and the floor of the body of water.

13. The system of claim 11, also comprising:

at least one antenna having an axis, towed by said floating vessel in the body of water so that said axis is substantially perpendicular to said electric dipole current source.

14. A system for surveying and characterizing an earth formation beneath a body of water having a surface and a floor, comprising:

a floating vessel;

an electric dipole current source including a pair of source electrodes separated by a first distance, towed from said floating vessel in the body of water substantially parallel to the surface of the body of water;

means for generating alernating electric current in the electric dipole current source;

at least one electric dipole detector including a pair of detector electrodes separted by a second distance substantially equal to said first distance, towed by said floating vessel in the body of water substantially collinearly with the current source and spaced from the current source by a third distance approximately equal to an integral multiple of said first distance;

means electrically coupled to the electric current generating means for measuring a current characteristic of said current;

means electrically coupled to the at least one electric dipole detector for measuring a characteristic of the potential difference between the pair of detector electrodes;

means electrically coupled to the current characteristic measuring means and the potential difference characteristic measuring means for determining a characteristic of the complex mutual impedance of the current source and said at least one detector from said current characteristic and said potential difference characteristic;

a gradient detector array towed from the floating vessel in a position separated from the mid-point of the pair of source electrodes, including a first pair of electrodes oriented substantially parallel to the current source and separated by a fourth distance less than said first distance, and including a second pair of electrodes oriented substantially orthogonal to the current source and separated by a fifth distance less than said first distance;

a first and a second controllable pod, each towed from the floating vessel in a position laterally separated from the current source;

a first three-axis magnetic field sensor means mounted in said first controllable instrument pod for obtaining true vector magnetic field measurements; and a second three-axis magnetic field sensor means mounted in said second controllable instrument pod for obtaining true vector magnetic field measurements.

15. The system of claim 14 wherein:

said first three-axis magnetic field sensor means includes a first orientation measurement system; and said second three-axis magnetic field sensor means includes a second orientation measurement system.

* * * * *